United States Patent
Davidsson et al.

(10) Patent No.: US 9,858,737 B2
(45) Date of Patent: Jan. 2, 2018

(54) METHODS AND SYSTEMS FOR ENABLING A TEMPORARY USER TO GAIN TEMPORARY ACCESS TO A LOCKED SPACE OF A VEHICLE

(71) Applicant: VOLVO CAR CORPORATION, Gothenburg (SE)

(72) Inventors: Staffan Davidsson, Vastra Frolunda (SE); Johan Maresch, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/706,034

(22) Filed: May 7, 2015

(65) Prior Publication Data
US 2015/0332531 A1 Nov. 19, 2015

(30) Foreign Application Priority Data

May 14, 2014 (EP) ..................... 14168290

(51) Int. Cl.
*G05B 19/00* (2006.01)
*G07C 9/00* (2006.01)
(Continued)

(52) U.S. Cl.
CPC .......... *G07C 9/00182* (2013.01); *B60R 25/24* (2013.01); *E05B 47/0001* (2013.01);
(Continued)

(58) Field of Classification Search
CPC ............ G07C 9/00182; G07C 9/00571; G07C 2209/04; B60R 25/24; E05B 47/0001;
(Continued)

(56) References Cited

U.S. PATENT DOCUMENTS 8,299,895 B2 10/2012 Harris
2010/0201482 A1 8/2010 Robertson et al.
(Continued)

FOREIGN PATENT DOCUMENTS

GB 2402840 12/2004

OTHER PUBLICATIONS

Extended European Search Report for European Application No. 14168290.6, Completed by the European Patent Office, dated Oct. 10, 2014, 15 Pages.

*Primary Examiner* — Dhaval Patel
(74) *Attorney, Agent, or Firm* — Brooks Kushman P.C.

(57) ABSTRACT

The present disclosure relates to a method for enabling a temporary user to gain temporary access to a locked space of a vehicle. The vehicle is configured to communicate with an intermediate system adapted to remotely control functionality of the vehicle. The intermediate system is configured to receive, from a user device associated with the temporary user, a request message to open a remotely operable lock of the locked space and further configured to, based on the request message, transmit an unlock message to the vehicle to open the lock. The request message from the user device includes access parameters to enable the lock to be unlocked, the access parameters received by the user device from a permission message transmitted by an owner device directly or indirectly to the user device.

16 Claims, 9 Drawing Sheets

(51) Int. Cl.
  *E05B 49/00* (2006.01)
  *E05B 47/00* (2006.01)
  *B60R 25/24* (2013.01)

(52) U.S. Cl.
  CPC .......... *E05B 49/00* (2013.01); *G07C 9/00571* (2013.01); *E05B 2047/005* (2013.01); *G07C 2209/04* (2013.01); *Y10T 70/5973* (2015.04)

(58) Field of Classification Search
  CPC . E05B 49/00; E05B 2047/005; Y10T 70/5973
  USPC .............. 340/5.2, 5.61, 5.72, 5.64, 5.8, 901; 705/5, 13, 35, 26.41, 307, 330; 701/36
  See application file for complete search history.

(56) References Cited

U.S. PATENT DOCUMENTS

| | | | |
|---|---|---|---|
| 2011/0112969 A1 | 5/2011 | Zaid et al. | |
| 2013/0099892 A1 | 4/2013 | Tucker et al. | |
| 2014/0002236 A1 | 1/2014 | Pineau et al. | |
| 2015/0348178 A1* | 12/2015 | Taylor | G06Q 30/0645 705/307 |
| 2016/0055699 A1* | 2/2016 | Vincenti | G07C 9/00309 340/5.61 |

\* cited by examiner

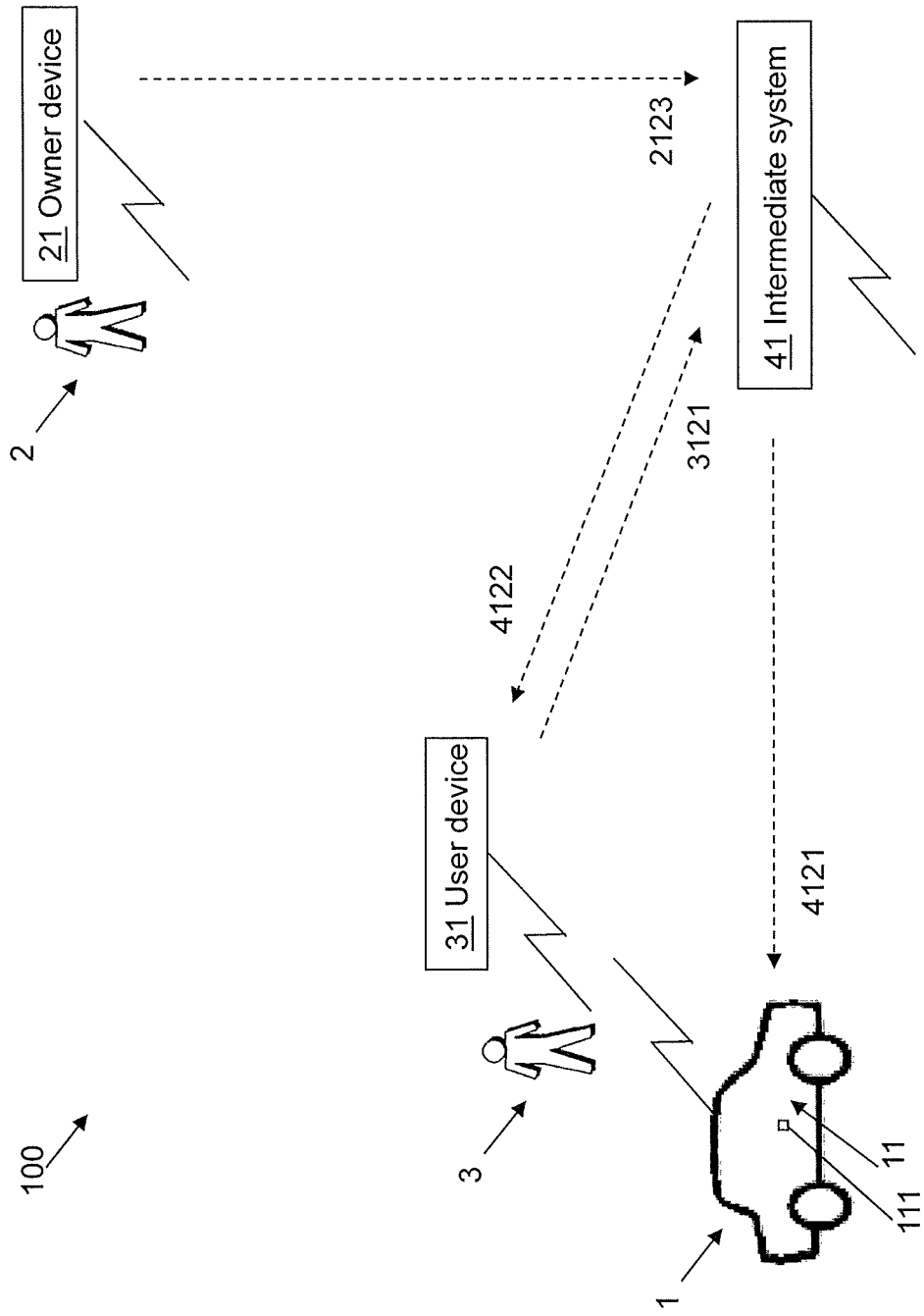

METHODS AND SYSTEMS FOR ENABLING A TEMPORARY USER TO GAIN TEMPORARY ACCESS TO A LOCKED SPACE OF A VEHICLE

CROSS-REFERENCE TO RELATED APPLICATIONS

This application claims foreign priority benefits under 35 U.S.C. §119(a)-(d) to European Patent Application No. EP 14168290.6, filed May 14, 2014, which is incorporated by reference in its entirety.

TECHNICAL FIELD

The present disclosure relates to enabling a temporary user to gain temporary access to a locked space of a vehicle.

BACKGROUND

Every now and then, the situation occurs when an owner of a vehicle, or at least a person in possession of a conventional or electronic key thereto, is in need of allowing someone else not in possession of such a key, access to the vehicle. Such a scenario may, for instance, arise if a family member or friend needs to pick up, or drop off, something in the vehicle. Another example may be a service provider of a delivered service, such as delivery of a product, e.g. a parcel, goods, dry cleaned clothes, food etc., or delivery of a service, such as a vehicle service, vehicle reconditioning or the like, while the vehicle is parked and locked. Traditionally, the vehicle owner would have to provide the temporary user of the vehicle with a conventional or electronic vehicle key to enable the access thereto. In recent years, however, solutions have been developed which enable access to the vehicle through other means.

US 2014/002236 relates to managing access to physical spaces using door identifying tokens and personal mobile devices as readers, via a network that uses the Internet.

U.S. Pat. No. 8,299,895, for instance, relates to controlling access to an automobile, e.g. by means of a cellular phone. It is disclosed how the cellular phone is mated with the vehicle system and thereafter used to obtain access to the vehicle.

However, although U.S. Pat. No. 8,299,895 suggests a limited function key for a cellular phone for temporary use, and thereby alleviates hassle related to lending a conventional or electronic vehicle key to a temporary user, there still remains uncertainties associated with providing temporary access to the vehicle to a temporary user.

SUMMARY

An object of some exemplary embodiments described herein is to provide an improved approach of enabling a temporary user to gain temporary access to a vehicle.

According to some exemplary embodiments described herein, the object is achieved by a method performed by an owner device associated with an owner of a vehicle, for enabling a temporary user to gain temporary access to a locked space of the vehicle. The vehicle is configured to communicate with an intermediate system adapted to remotely control functionality of the vehicle. The intermediate system is configured to receive, from a user device associated with the temporary user, a request message to open a remotely operable lock of the locked space. The intermediate system is further configured to, based on the request message, transmit an unlock message to the vehicle to open the lock. The method comprises that the owner device transmits a permission message comprising access parameters directly or indirectly to the user device. The access parameters are configured to be comprised in the request message to enable the lock to be unlocked based on the access parameters.

Thereby, the access conditions incorporated by the access parameters, which descend from the permission message dictated and transmitted from the owner device to the user device and subsequently to the intermediate system in the request message, are utilized by the intermediate system as underlying conditions for the subsequent provision of the intended temporary access to the locked space. That is, since the access parameters hold access conditions dictated by e.g. the owner via the owner device, and since the access parameters are relayed to the user device via the permission message, and subsequently relayed, e.g. on initiation of the temporary user, to the intermediate system, the intermediate system may take into consideration the access conditions as defined by the access parameters in the subsequent unlocking/locking of the remotely operable lock.

Accordingly, there is provided a solution according to which uncertainties commonly associated with allowing a temporary user temporary access to a vehicle, are alleviated.

Furthermore, an approach is suggested according to which the owner may set up his or her own access conditions as considered suitable for the specific intended temporary access in question.

For that reason, there is provided an improved approach of enabling a temporary user to gain temporary access to a vehicle.

The technical features and corresponding advantages of the above mentioned method will be discussed in further detail in the following.

By introducing a method performed by an owner device associated with an owner of a vehicle, for enabling a temporary user to gain temporary access to a locked space of the vehicle, an approach is provided which enables for an owner of a vehicle to allow someone else, not in possession of a key thereto, a restricted and/or conditioned access to the vehicle of the owner. The referred to "vehicle" may be any arbitrary vehicle, for instance a car, truck, lorry, van, bus, tractor, military vehicle, air plane, or vessel. Furthermore, the "owner" of the vehicle is intended to be interpreted in a broad manner, likewise referring to any arbitrary person accountable for the vehicle, or a person in possession of "constant" or "continuous" access rights to remotely control, such as unlock, the vehicle.

The "temporary user" of the vehicle is, in a similar manner, intended to be interpreted in a broad manner, likewise referring to someone to whom it is intended to provide conditional access to a locked space of the vehicle. The temporary user may hence refer to e.g. a family member or a friend. Additionally or alternatively, the temporary user may refer to a service provider being trusted to provide a delivered service while the vehicle is parked and locked, such as delivery of a product, e.g. a parcel, goods, dry cleaned clothes, food etc., or a delivery of service, such as e.g. a vehicle service, vehicle reconditioning or the like. Furthermore, the "temporary access" is intended to refer to the temporary user being allowed access to the locked space, which access is restricted by conditions, e.g. regarding access time frame and/or number of times being allowed access.

The referred to "owner device" may be any arbitrary electronic unit which is capable of communicating with other units, and which is adapted to provide a software tool via which conditions for an intended provision of a temporary access to the vehicle may be dictated. The owner device may hence, for instance, be represented by a stationary computer or a mobile user equipment, for instance a mobile terminal or wireless terminal, a mobile phone or smart phone, a computer such as e.g. a laptop, a Personal Digital Assistant (PDA) or tablet computer, sometimes referred to as a surf plate, with wireless capability, or for example, a portable, pocket-storable, hand-held, computer-comprised mobile device. Furthermore, "associated with" is throughout this disclosure intended to be interpreted to likewise include e.g. "in possession of", "carried by", and "used by".

Since the vehicle is configured to communicate with an intermediate system adapted to remotely control functionality of the vehicle, a locked space of the vehicle may, for instance, be unlocked or locked, following instructions submitted from the intermediate system. Utilizing the intermediate system enables for updated instructions to override previous instructions, such as for instance cancelling of a previous instruction to allow a temporary access to the vehicle. The intermediate system may refer to any arbitrary assisting and/or managing system, such as a remotely located server, allowed to and adapted for remotely controlling functionality of the vehicle, such as providing access thereto. The intermediate system may for instance be represented by a Volvo On Call system. The vehicle may be adapted to communicate with the intermediate system as commonly known in the art, for instance via a wireless network.

Since the intermediate system is configured to receive, from a user device associated with the temporary user, a request message to open a remotely operable lock of the locked space, the user device may, for instance by initiation of the temporary user, be adapted to submit a request for the intermediate system to remotely open the lock of the locked space of the vehicle. By the lock being "remotely operable" is here intended to indicate that the lock may be controlled to be unlocked or locked from a far distance, i.e. from the remotely arranged intermediate server. The remotely operable lock may for instance be represented by one or a combination of a vehicle door lock, trunk lock, engine hood lock, fuel lid lock or a lock to an isolated section of the vehicle, e.g. a separate compartment through which the interior body of the vehicle may not be reached. For instance, allowing temporary access to the engine hood, fuel lid and/or body may enable a vehicle mechanics to perform e.g. a vehicle service, vehicle reconditioning or the like. In addition thereto, subsequent being allowed access to the locked space, the temporary user may further be given access to e.g. start the engine, or access data of the vehicle. Similarly, allowing temporary access to the body, trunk and/or isolated section may enable e.g. a family member or friend to pick up, or drop off, something in the vehicle, or e.g. a service provider to deliver a product, e.g. a parcel, goods, dry cleaned clothes, food etc. while the vehicle is parked and initially locked.

The lock may further, according to an example, comprise—or be in communication with a unit providing—functionality which allows for detection and/or storage of events related to access given to the lock, or opening/closing of a door, hatch, lid etc. associated with the lock. Thereby, tracking of events related to the lock may be enabled.

The referred to "user device" may be any arbitrary electronic unit which is capable of communicating with other units, and which is adapted to provide, e.g. compose, and transmit a request message to the intermediate system. The user device may hence, for instance, be represented by a stationary computer or a mobile user equipment, for instance a mobile terminal or wireless terminal, a mobile phone or smart phone, a computer such as e.g. a laptop, a Personal Digital Assistant (PDA) or tablet computer, sometimes referred to as a surf plate, with wireless capability, or for example, a portable, pocket-storable, hand-held, computer-comprised mobile device. Furthermore, as previously indicated, "associated with" is throughout this disclosure intended to be interpreted in a broad manner, likewise including e.g. "in possession of", "carried by", and "used by".

The referred to "request message" to open the lock may be represented by any arbitrary type of message supported in the communication between the user device and the intermediate system. The request message may hence be comprised in a generic message format or a message of customized format, and e.g. represented by a push message.

Since the intermediate system is further configured to, based on the request message, transmit an unlock message to the vehicle to open the lock, the intermediate system may instruct the vehicle to unlock the lock under the conditions being indicated by the content of the request message. The referred to "unlock message" to open the lock may be represented by any arbitrary type of message supported in the communication between the intermediate system and the vehicle. The unlock message may hence be comprised in a generic message format or a message of customized format, as known in the art. Furthermore, "based on" is throughout this disclosure intended to be interpreted to likewise include at least "utilizing", "considering" and "taking into account".

Since the owner device transmits a permission message comprising access parameters directly or indirectly to the user device, the owner device may, supposedly by initiation of the owner, submit a message to the user device indicating conditions under which temporary access the locked space may be allowed. Thereby, access conditions for the intended specific temporary access at hand may be dictated as suitable or preferred by the owner. The referred to "access parameters" may be represented by any arbitrary parameters indicating conditions of the intended provision of temporary access, relating for instance to access timing and vehicle identity.

The "permission message" may be transmitted directly from the owner device to the user device, or, alternatively, for instance indirectly via the intermediate system to the user device. The permission message may, in the latter case, to some extent be amended in the intermediate system to suit a possible differing communication format between the intermediate system and the user device, as compared to the communication format between the owner device and the intermediate system. Furthermore, the permission message may, should it be routed via the intermediate system, be amended in the intermediate system to comprise a subset of the content of the permission message, or amended to comprise an extension thereof prior to being transmitted to the user device.

Furthermore, the "permission message" may be represented by any arbitrary type of message supported in the communication between the owner device and the user device, and possible the intermediate system. The permission message may hence be comprised in a generic message format or a message of customized format, and e.g. represented by a push message. According to one example, the owner device is e.g. a smart phone provided with a vehicle control application, i.e. an "app", such as e.g. the commonly known Volvo On Call app, enabling control of functionality of the vehicle via the intermediate system. The vehicle control app may be adapted to provide the owner device, and subsequently the owner, with a software tool via which conditions for an intended provision of a temporary access to the vehicle may be dictated, which conditions subsequently may be embedded in a permission message and submitted to the user device.

Since the access parameters are configured to be comprised in the request message to enable the lock to be unlocked based on the access parameters, the access conditions incorporated by the access parameters, which descend from the permission message dictated and transmitted from the owner device, are utilized by the intermediate server as underlying conditions for the subsequent provision of temporary access to the locked space. That is, since the access parameters hold access conditions dictated by e.g. the owner via the owner device, and since the access parameters are relayed to the user device via the permission message, and subsequently relayed, e.g. on initiation of the temporary user, to the intermediate system, the intermediate system may take into consideration the access conditions as defined by the access parameters in the subsequent unlocking/locking of the lock. Accordingly, an owner of a vehicle may, via an owner device, dictate access conditions for a temporary user, which access conditions are submitted, via the user device, to the temporary user, which access conditions subsequently may be submitted to the intermediate system to thereby constitute a basis for the provision of the temporary access of the locked space as provided by the intermediate system.

According to an embodiment, the permission message may comprise a user selectable web link connecting to the remote intermediate system, which web link is adapted to, upon being selected, initiate the request message to be transmitted to the intermediate system. Thereby, when the web link is selected, supposedly by the temporary user, a web interface associated with the web link provides a means for the temporary user to instruct the intermediate system to follow through on the enabling of the intended temporary access. That is, transmission of the request message may here be represented by the web link being selected and subsequently the intended temporary access being confirmed, supposedly by the temporary user, via the web interface. The referred to "web link" may for instance be represented by a http address. Furthermore, the web link "connecting to the intermediate system" may indicate an input port to the intermediate system.

According to one embodiment, the permission message may be comprised in at least one Short Message Service, SMS, message, at least one email and/or a corresponding type of message. Thereby, a generic, commonly implemented message format may be utilized for submission of the permission message. The referred to "corresponding type" may refer to a message of a generic format, or a message of a customized format.

According to another embodiment, the access parameters may comprise one or several of vehicle identification parameters, time frame parameters, location parameters, and/or recurrence parameters. Thereby, access conditions in terms of vehicle identification parameters, time frame parameters, location parameters, and/or recurrence parameters for the intended specific temporary access may be dictated as suitable or preferred by the owner. "Vehicle identification parameters" may comprise parameters indicating the identity of the vehicle in question, whereas "time frame parameters" may comprise parameters indicating for instance a temporary access start time and/or end time, a temporary access duration restriction, and/or a temporary access time window. Furthermore, "location parameters" may comprise parameters indicating a vehicle location restriction, i.e. that the vehicle in question may need to be located in a specific area for allowing temporary access, or a corresponding temporary user location restriction, whereas "recurrence parameters" may comprise parameters indicating a number of times temporary access is allowed. Further parameters, such as e.g. identity of the owner, are likewise feasible.

According to yet another embodiment, the owner device may transmit a verification message to the intermediate system, which verification message comprises verification parameters corresponding to the access parameters. The unlock message is adapted to additionally be based on the verification message, to enable the lock to be unlocked additionally based on the verification parameters. Thereby, by the owner device submitting a verification message to the intermediate system, in addition to submitting the permission message to the user device, the intermediate system is enabled to consider the verification parameters of the verification message prior to following through on the requested temporary access. Accordingly, the intermediate system may perform an additional safety check in comparing the verification parameters to the access parameters.

The unlock message being adapted to "additionally be based on" the verification parameters, and the lock being enabled to be unlocked "additionally based on" the verification parameters, is here hence intended to indicate that the intermediate system takes the verification parameters into account in addition to the access parameters.

The referred to "verification message" may be represented by any arbitrary type of message supported in the communication between the owner device and the intermediate system. The verification message may hence be comprised in a generic message format or a message of customized format, as known in the art. The verification message may be comprised in at least one Short Message Service, SMS, message, at least one email and/or a corresponding type of message, such as for instance a message of a generic format or a message of a customized format according to which the owner device may communicate with the intermediate system.

Furthermore, the referred to "verification parameters" may be represented by any arbitrary parameters indicating conditions of the intended provision of temporary access. That is, the verification parameters may comprise one or several of vehicle identification parameters, time frame parameters, location parameters, and/or recurrence parameters. Furthermore, the verification parameters may comprise a subset of the access parameters, and/or further parameters applicable to indicate the framing of the intended, subsequent, temporary access provision. The verification parameters "corresponding to" the access parameters, is here intended to be interpreted to likewise include e.g. "being associated with", "being similar to", and "comprising a subset or an extension of".

According to yet another embodiment, the locked space may be one or a combination of a body, a trunk, an engine hood, a fuel lid and/or an isolated section of the vehicle. Thereby, different parts of the vehicle, which respectively are provided with one or several remotely operable locks, may come in question for the temporary access. The locked space being a "body" of the vehicle is here intended to indicate the passenger compartment of the vehicle, i.e. the interior of the vehicle, to which access may be restricted by one or several vehicle doors. The locked space being an "isolated section" of the vehicle may refer to e.g. a separate compartment comprised in the vehicle, through which the interior body of the vehicle cannot be reached.

According to some embodiments described herein, the object is achieved by a method performed by a user device associated with a temporary user, for enabling the temporary user to gain temporary access to a locked space of a vehicle. The vehicle is configured to communicate with an intermediate system adapted to remotely control functionality of the vehicle. The intermediate system is configured to transmit an unlock message to the vehicle to open a remotely operable lock of the locked space. The method comprises that the user device receives a permission message directly or indirectly from an owner device associated with an owner of the vehicle, which permission message comprises access parameters. The user device furthermore transmits a request message to open the lock, to the intermediate system. The request message comprises the access parameters, whereby the unlock message is adapted to be based on the request message to enable the lock to be unlocked based on the access parameters.

According to an embodiment, the unlock message may further be adapted to additionally be based on a verification message configured to be transmitted from the owner device to the intermediate system. The verification message comprises verification parameters corresponding to the access parameters, wherein the lock is enabled to be unlocked additionally based on the verifications parameters.

According to yet another embodiment, the permission message may comprise a user selectable web link connecting to the remote intermediate system, wherein transmitting the request message comprises the web link being selected.

According to one embodiment, the permission message may be comprised in at least one Short Message Service, SMS, message, at least one email and/or a corresponding type of message.

According to another embodiment, the access parameters may comprise one or several of vehicle identification parameters, time frame parameters, location parameters, and/or recurrence parameters.

According to yet another embodiment, the locked space may be one or a combination of a body, a trunk, an engine hood, a fuel lid and/or an isolated section of the vehicle.

Similar advantages as those mentioned in relation to former exemplary embodiments correspondingly apply to the latter exemplary embodiments; hence these advantages are not further discussed.

According to some exemplary embodiments described herein, the object is achieved by a method performed by an intermediate system adapted to remotely control functionality of a vehicle, for enabling a temporary user to gain temporary access to a locked space of the vehicle. The intermediate system is configured to directly or indirectly communicate with an owner device associated with an owner of the vehicle. The owner device is configured to transmit a permission message comprising access parameters directly or indirectly to a user device associated with the temporary user. The method comprises that the intermediate system receives a request message to open a remotely operable lock of the locked space from the user device, which request message comprises the access parameters. The intermediate system furthermore transmits, based on the request message, an unlock message to the vehicle to open the lock, whereby the lock is enabled to be unlocked based on the access parameters.

According to an embodiment, the permission message may comprise a user selectable web link connecting to the remote intermediate system. The web link is adapted to, upon being selected, initiate the request message to be transmitted to the intermediate system.

According to another embodiment, the intermediate system may further receive a verification message from the owner device, which verification message comprises verification parameters corresponding to the access parameters. The unlock message is adapted to additionally be based on the verification message, to enable the lock to be unlocked additionally based on the verification parameters.

According to one embodiment, the permission message may be comprised in at least one Short Message Service, SMS, message, at least one email and/or a corresponding type of message.

According to another embodiment, the access parameters may comprise one or several of vehicle identification parameters, time frame parameters, location parameters, and/or recurrence parameters.

According to yet another embodiment, the locked space may be one or a combination of a body, a trunk, an engine hood, a fuel lid and/or an isolated section of the vehicle.

Yet again, similar advantages as those mentioned in relation to former exemplary embodiments correspondingly apply to the latter exemplary embodiments; hence these advantages are not further discussed.

According to some exemplary embodiments described herein, the object is achieved by a method performed by a temporary access system comprising an owner device, a user device and an intermediate system, for enabling a temporary user to gain temporary access to a locked space of a vehicle. The temporary access system performs the actions of the owner device discussed in the foregoing, the actions of the previously discussed user device, and the actions of the intermediate system discussed in the foregoing. Once more, similar advantages as those mentioned in relation to former exemplary embodiments correspondingly apply to the latter exemplary embodiments; hence these advantages are not further discussed.

According to some exemplary embodiments described herein, the object is achieved by an owner device adapted to be associated with an owner of a vehicle, for enabling a temporary user to gain temporary access to a locked space of the vehicle. The vehicle is configured to communicate with an intermediate system adapted to remotely control functionality of the vehicle. The intermediate system is configured to receive, from a user device associated with the temporary user, a request message to open a remotely operable lock of the locked space and further configured to, based on the request message, transmit an unlock message to the vehicle to open the lock. The owner device comprises an owner transmitting unit adapted for transmitting a permission message comprising access parameters directly or indirectly to the user device. The access parameters are configured to be comprised in the request message to enable the lock to be unlocked based on the access parameters. Again, similar advantages as those mentioned in relation to former exemplary embodiments correspondingly apply to the latter exemplary embodiments; hence these advantages are not further discussed.

According to some exemplary embodiments described herein, the object is achieved by a user device adapted to be associated with a temporary user, for enabling the temporary user to gain temporary access to a locked space of a vehicle. The vehicle is configured to communicate with an intermediate system adapted to remotely control functionality of the vehicle. The intermediate system is configured to transmit an unlock message to the vehicle to open a remotely operable lock of the locked space. The user device comprises a user receiving unit adapted for receiving a permission message directly or indirectly from an owner device associated with an owner of the vehicle, which permission message comprises access parameters. The user device further comprises a user transmitting unit adapted for transmitting a request message to open the lock, to the remote intermediate system, wherein the request message comprises the access parameters. The unlock message is adapted to be based on the request message to enable the lock to be unlocked based on the access parameters. Once more, similar advantages as those mentioned in relation to former exemplary embodiments correspondingly apply to the latter exemplary embodiments; hence these advantages are not further discussed.

According to some exemplary embodiments described herein, the object is achieved by an intermediate system adapted to remotely control functionality of a vehicle, for enabling a temporary user to gain temporary access to a locked space of the vehicle. The intermediate system is configured to directly or indirectly communicate with an owner device associated with an owner of the vehicle. The owner device is configured to transmit a permission message comprising access parameters directly or indirectly to a user device associated with the temporary user. The intermediate system comprises an intermediate receiving unit adapted for receiving a request message to open a remotely operable lock of the locked space from the user device, which request message comprises the access parameters. The intermediate system further comprises an intermediate transmitting unit adapted for transmitting, based on the request message, an unlock message to the vehicle to open the lock, whereby the lock is enabled to be unlocked based on the access parameters. Yet again, similar advantages as those mentioned in relation to former exemplary embodiments correspondingly apply to the latter exemplary embodiments; hence these advantages are not further discussed.

According to some embodiments described herein, the object is achieved by a temporary access system adapted for enabling a temporary user to gain temporary access to a locked space of a vehicle. The temporary access system comprises the owner device discussed in the foregoing, the previously discussed user device, and the intermediate system discussed in the foregoing. Once more, similar advantages as those mentioned in relation to former exemplary embodiments correspondingly apply to the latter exemplary embodiments; hence these advantages are not further discussed.

According to some embodiments described herein, the object is achieved by a vehicle comprising a remotely operable lock of a locked space of the vehicle, which vehicle is adapted for enabling a temporary user to gain temporary access to the locked space. The vehicle is configured to communicate with an intermediate system adapted to remotely control functionality of the vehicle. The intermediate system is configured to directly or indirectly communicate with an owner device associated with an owner of the vehicle. The owner device is adapted for transmitting a permission message comprising access parameters directly or indirectly to a user device associated with the temporary user The user device is adapted for transmitting a request message to open the lock, to the remote intermediate system, which request message is configured to comprise the access parameters. The vehicle is adapted to receive, from the intermediate system, based on the request message, an unlock message to open the lock, whereby the lock is enabled to be unlocked based on the access parameters. Yet again, similar advantages as those mentioned in relation to former exemplary embodiments correspondingly apply to the latter exemplary embodiments; hence these advantages are not further discussed.

BRIEF DESCRIPTION OF THE DRAWINGS

Various aspects of the disclosure, including particular features and advantages, will be readily understood from the following detailed description and the accompanying drawings, in which:

FIG. 1c illustrates an exemplifying temporary access system for enabling a temporary user to gain temporary access to a locked space of a vehicle, according to yet other embodiments of the disclosure;

DETAILED DESCRIPTION

Figure 1A:
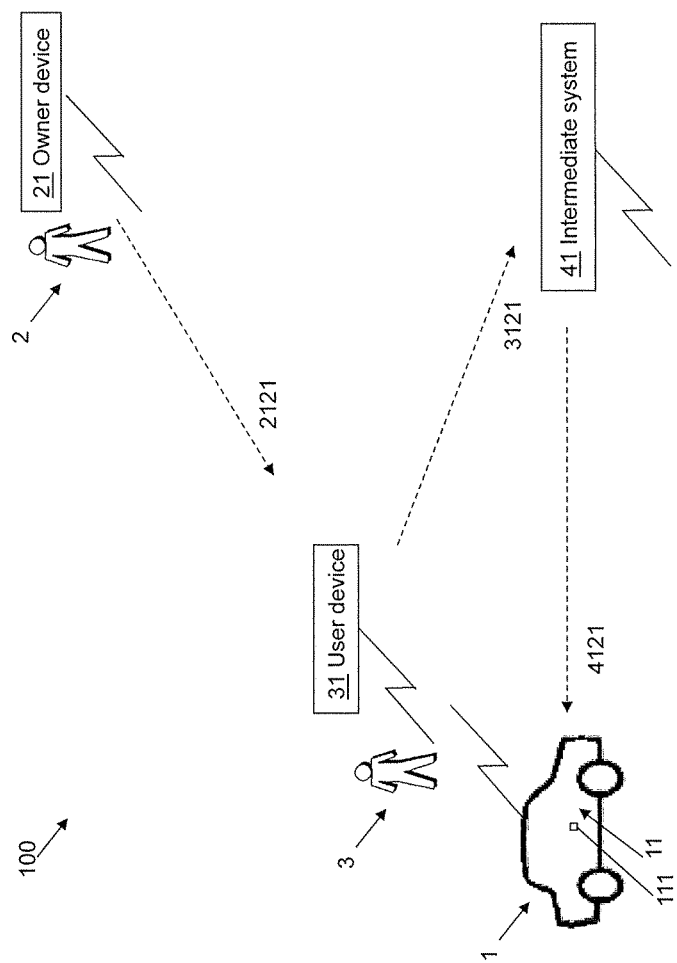
FIG. 1a illustrates an exemplifying temporary access system for enabling a temporary user to gain temporary access to a locked space of a vehicle, according to embodiments of the disclosure.

As required, detailed embodiments are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to enabling a temporary user to gain temporary access to a locked space of a vehicle, there will be disclosed how access conditions incorporated by access parameters, which descend from a permission message dictated and transmitted from an owner device to a user device and subsequently to an intermediate system in a request message, may be utilized by the intermediate system as underlying conditions for a subsequent provision of temporary access to the locked space.

Referring now to the figures and FIG. 1a in particular, there is depicted an exemplifying temporary access system 100 for enabling a temporary user to gain temporary access to a locked space of a vehicle, according to embodiments of the disclosure.

In the illustrated embodiment of FIG. 1a, there is depicted a vehicle 1, here a car. The vehicle 1 comprises a remotely operable lock 111 of a locked space 11 of the vehicle 1. The locked space 11 is here represented by the interior space of the vehicle 1 itself, i.e. the body of the vehicle 1. According to alternative embodiments, however, the locked space 11 may be represented by one or a combination of the body, a trunk, an engine hood, a fuel lid and/or an isolated section of the vehicle 1. The remotely operable lock 111 is here represented by one, or several, of the door locks of the vehicle 1.

The vehicle 1 is adapted for enabling a temporary user 3 to gain temporary access to the locked space 11. The temporary user 3 is represented by a person whom may be given access to the locked space 11, here to the interior space of the vehicle 1, during a restricted period of time. The vehicle 1 is further configured to communicate with an intermediate system 41 adapted to remotely control functionality of the vehicle 1. The intermediate system 41 is according to the embodiment of FIG. 1a represented by an adapted management and/or assisting system, such as e.g. Volvo On Call.

Furthermore, the intermediate system 41 is configured to directly or indirectly communicate with an owner device 21 associated with an owner 2 of the vehicle 1. The owner 2 is here represented by a person having "continuous", rather than temporary, access to the vehicle, and the owner device 21 is her represented by an adapted smart phone. The owner device 21 has, according to the embodiment of FIG. 1a, installed thereon functionality such as a vehicle control application, i.e. an "app", such as e.g. a Volvo On Call app, enabling control of functionality of the vehicle 1 by communicating with the intermediate system 41.

The owner device 21 is adapted for transmitting a permission message 2121 comprising access parameters directly or indirectly to a user device 31 associated with the temporary user 3. The permission message 2121 may be comprised in at least one Short Message Service, SMS, message, at least one email and/or a corresponding type of message. A corresponding type of message may for instance be a message of a generic format, or a message of a customized format according to which the owner device 21 may communicate with the user device 31. Here, the permission message 2121 is represented by an SMS, which may be generated by the owner 2 selecting settings via the vehicle control app, and which subsequently may lead to giving the temporary user 3 temporary access to the vehicle 1. The access parameters of the illustrated embodiment comprise one or several of vehicle identification parameters, time frame parameters, location parameters, and/or recurrence parameters.

The user device 31 is here represented by a smart phone having functionality enabling for communication with other electronic devices. The user device 31 is adapted for transmitting a request message 3121 to open the lock 111, to the remote intermediate system 41, which request message 3121 is configured to comprise the access parameters. Correspondingly, the intermediate system 41 is configured to receive the request message 3121.

The request message 3121 may be comprised in at least one Short Message Service, SMS, message, at least one email and/or a corresponding type of message, such as for instance a message of a generic format or a message of a customized format according to which the user device 31 may communicate with the intermediate system 41. However, according to the embodiment of FIG. 1a, the permission message 2121 comprises a user selectable web link connecting to the remote intermediate system 41, which web link is adapted to, upon being selected, initiate the request message 3121 to be transmitted to the intermediate system 41. Thus, in the shown embodiment, the temporary user 3 may, by selecting, on the user device 31, the web linked incorporated in the permission message 3121, be redirected to e.g. a web interface associated with the intermediate system 41, via which web interface the temporary user 3 may confirm to the intermediate system 41 the request for the intended temporary access. The request message 3121 may hence here be represented by the temporary user 3, subsequent being redirected to the web interface, selecting an option provided by the web interface to carry out opening of the lock 111, as dictated by the access parameters.

Furthermore, the vehicle 1 is adapted to receive, from the intermediate system 41, based on the request message 3121, an unlock message 4121 to open the lock 111, whereby the lock 111 is enabled to be unlocked based on the access parameters. Correspondingly, the intermediate system 41 is configured to, based on the request message 3121, transmit the unlock message 4121 to the vehicle 1 to open the lock 111. The unlock message 4121 may be comprised in at least one Short Message Service, SMS, message, at least one email and/or a corresponding type of message, such as for instance a message of a generic format or a message of a customized format according to which the intermediate system 41 may communicate with the vehicle 1.

Figure 1B:
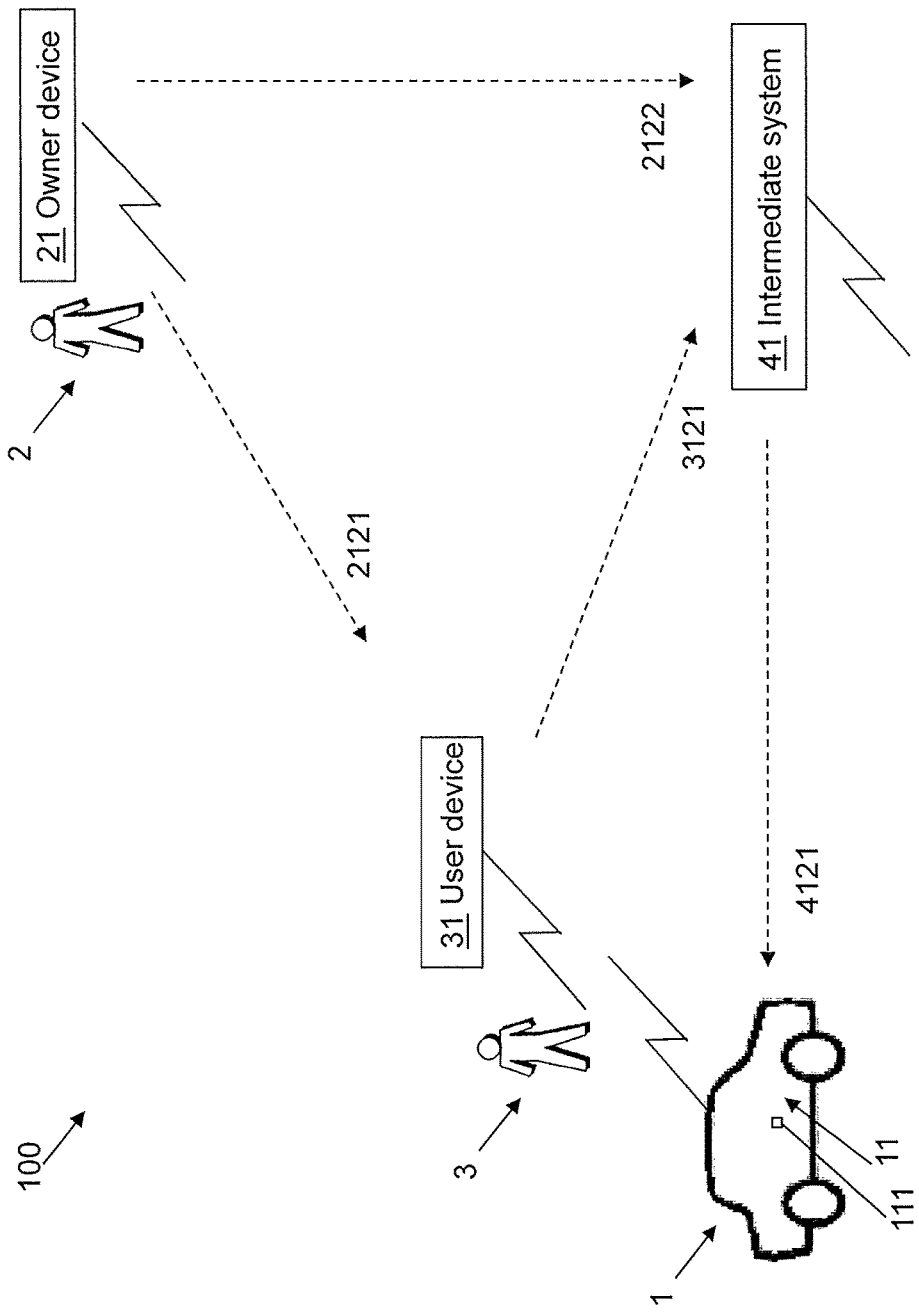
FIG. 1b illustrates an exemplifying temporary access system for enabling a temporary user to gain temporary access to a locked space of a vehicle, according to alternative embodiments of the disclosure.

FIG. 1b illustrates an exemplifying temporary access system for enabling a temporary user to gain temporary access to a locked space of a vehicle, according to alternative embodiments of the disclosure. The embodiment of FIG. 1b is similar to that of FIG. 1a, with the difference of an additional optional verification message 2122 provided by the owner device 21 to the intermediate system 41.

That is, the owner device 21 is configured to transmit a verification message 2122 to the intermediate system 41, which verification message 2122 comprises verification parameters corresponding to the access parameters, whereby the unlock message 4121 is adapted to additionally be based on the verification message 2122, to enable the lock 111 to be unlocked additionally based on the verification parameters. Correspondingly, the intermediate system 41 is configured to receive the verification message 2122 from the owner device 21.

The verification message 2122 may be comprised in at least one Short Message Service, SMS, message, at least one email and/or a corresponding type of message, such as for instance a message of a generic format or a message of a customized format according to which the owner device 21 may communicate with the intermediate system 41. Furthermore, the verification parameters may, in a similar manner to the access parameters, comprise one or several of vehicle identification parameters, time frame parameters, location parameters, and/or recurrence parameters. Furthermore, the verification parameters may comprise a subset of the access parameters, and/or further parameters applicable to indicate the framing of the intended, subsequent, temporary access provision.

FIG. 1*c* illustrates an exemplifying temporary access system for enabling a temporary user to gain temporary access to a locked space of a vehicle, according to yet other embodiments of the disclosure. The embodiment of FIG. 1*c* is similar to that of FIG. 1*a*, with the difference being an alternative optional communication path of the permission message 2121 from the owner device 21 to the user device 31.

That is, in the embodiment of FIG. 1*c*, the permission message 2121 of FIG. 1*a* is adapted to be transmitted via the intermediate system 41. The permission message 2121 is hence represented by a first message 2123 submitted from the owner device 21 to the intermediate system 41, and a second message 4122 submitted from the intermediate system 41 to the vehicle 1. The second message 4122 is here essentially identical to the first message 2123; however, according to alternative embodiments, the second message 4122 may comprise a subset of the first message 2123, and/or be expanded to comprise further parameters applicable to indicate the framing of the intended temporary access.

Figure 2:
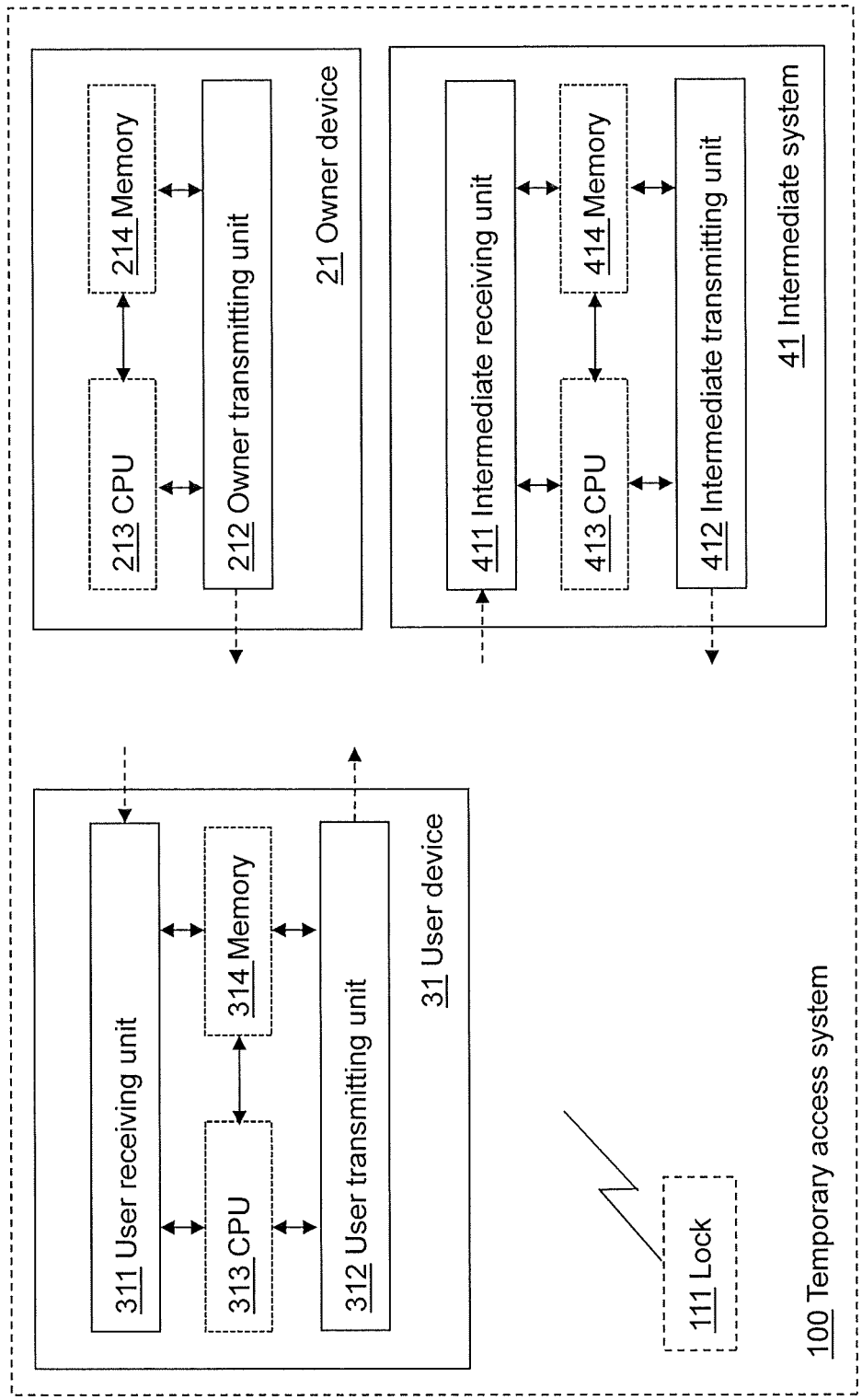
FIG. 2 is a schematic block diagram illustrating a temporary access system according to embodiments of the disclosure.

As further shown in FIG. 2, which depicts a schematic block diagram illustrating the exemplifying temporary access system 100 according to embodiments of the disclosure, the temporary access system 100 is adapted for enabling the temporary user 3 to gain temporary access to the locked space 11 of the vehicle 1, and comprises the owner device 21, the user device 31 and the intermediate system 41. The temporary access system 100 may further optionally comprise the remotely operable lock 111.

The owner device 21 comprises an owner transmitting unit 212 adapted for transmitting the permission message 2121 comprising the access parameters directly or indirectly to the user device 31. Furthermore, the embodiments herein for enabling the temporary user 3 to gain temporary access to the locked space 11 of the vehicle 1, may be implemented through one or more processors, such as a processor 213, here denoted CPU, together with computer program code for performing the functions and actions of the embodiments herein. Said program code may also be provided as a computer program product, for instance in the form of a data carrier carrying computer program code for performing the embodiments herein when being loaded into the owner device 21. One such carrier may be in the form of a CD ROM disc. It is however feasible with other data carriers such as a memory stick. The computer program code may furthermore be provided as pure program code on a server and downloaded to the owner device 21.

The owner device 21 may further comprise a memory 214 comprising one or more memory units. The memory 214 may be arranged to be used to store e.g. information, and further to store data, configurations, schedulings, and applications, to perform the methods herein when being executed in the owner device 21. Furthermore, the owner transmitting unit 212, the processor 213, and the memory 214 may for instance be implemented in one or several arbitrary electronic devices having communication capabilities. Those skilled in the art will also appreciate that the owner transmitting unit 212 described above, and which will be described in more detail later on in this description, may refer to a combination of analog and digital circuits, and/or one or more processors configured with software and/or firmware, e.g. stored in a memory such as the memory 214, that when executed by the one or more processors such as the processor 213 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

The user device 31 comprises a user receiving unit 311 adapted for receiving the permission message 2121 directly or indirectly from the owner device 21, and a user transmitting unit 312 adapted for transmitting the request message 3121 to open the lock 111 to the remote intermediate system 41. Furthermore, the embodiments herein for enabling the temporary user 3 to gain temporary access to the locked space 11 of the vehicle 1, may be implemented through one or more processors, such as a processor 313, here denoted CPU, together with computer program code for performing the functions and actions of the embodiments herein. Said program code may also be provided as a computer program product, for instance in the form of a data carrier carrying computer program code for performing the embodiments herein when being loaded into the user device 31. One such carrier may be in the form of a CD ROM disc. It is however feasible with other data carriers such as a memory stick. The computer program code may furthermore be provided as pure program code on a server and downloaded to the user device 31.

The user device 31 may further comprise a memory 314 comprising one or more memory units. The memory 314 may be arranged to be used to store e.g. information, and further to store data, configurations, schedulings, and applications, to perform the methods herein when being executed in the user device 31. Furthermore, the user receiving unit 311 and the user transmitting unit 312, the processor 313, and the memory 314 may for instance be implemented in one or several arbitrary electronic devices having communication capabilities. Those skilled in the art will also appreciate that the user receiving unit 311 and the user transmitting unit 312 described above, and which will be described in more detail later on in this description, may refer to a combination of analog and digital circuits, and/or one or more processors configured with software and/or firmware, e.g. stored in a memory such as the memory 314, that when executed by the one or more processors such as the processor 313 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

The intermediate system 41 comprises an intermediate receiving unit 411 adapted for receiving the request message 3121 to open the remotely operable lock 111 from the user device 31, and an intermediate transmitting unit 412 adapted for transmitting, based on the request message 3121, the unlock message 4121 to the vehicle 1 to open the lock 111. Furthermore, the embodiments herein for enabling the temporary user 3 to gain temporary access to the locked space 11 of the vehicle 1, may be implemented through one or more processors, such as a processor 413, here denoted CPU, together with computer program code for performing the functions and actions of the embodiments herein. Said program code may also be provided as a computer program product, for instance in the form of a data carrier carrying computer program code for performing the embodiments herein when being loaded into the intermediate system 41. One such carrier may be in the form of a CD ROM disc. It is however feasible with other data carriers such as a memory stick. The computer program code may furthermore be provided as pure program code on a server and downloaded to the intermediate system 41.

The intermediate system 41 may further comprise a memory 414 comprising one or more memory units. The memory 414 may be arranged to be used to store e.g. information, and further to store data, configurations, schedulings, and applications, to perform the methods herein when being executed in the intermediate system 41. Furthermore, the intermediate receiving unit 411 and the intermediate transmitting unit 412, the processor 413, and the memory 414 may for instance be implemented in a management and/or assisting system adapted to remotely control functionality of the vehicle 1. Those skilled in the art will also appreciate that the intermediate receiving unit 411 and the intermediate transmitting unit 412 described above, and which will be described in more detail later on in this description, may refer to a combination of analog and digital circuits, and/or one or more processors configured with software and/or firmware, e.g. stored in a memory such as the memory 414, that when executed by the one or more processors such as the processor 413 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 3:
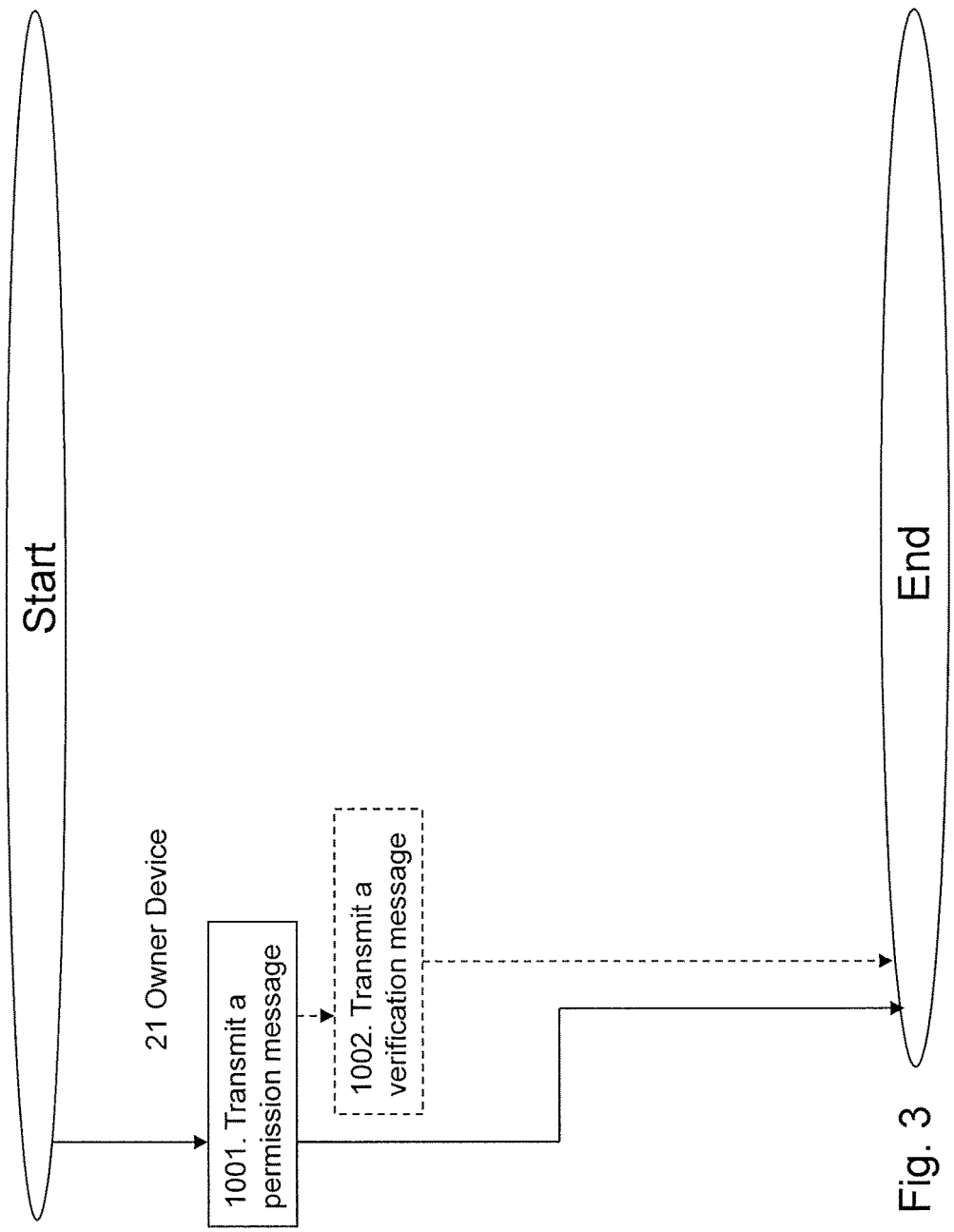
FIG. 3 is a flowchart depicting an exemplifying method performed by an electronic owner device associated with an owner of a vehicle, for enabling a temporary user to gain temporary access to a locked space of the vehicle, according to embodiments of the disclosure.

FIG. 3 is a flowchart depicting an exemplifying method performed by the owner device 21 associated with the owner 2 of the vehicle 1, for enabling the temporary user 3 to gain temporary access to the locked space 11 of the vehicle 1, according to embodiments of the disclosure. The exemplifying method, which may be continuously repeated, comprises the following actions discussed with support from FIGS. 1 and 2. The actions may be taken in any suitable order, or even simultaneously.

The vehicle 1 is configured to communicate with the intermediate system 41 adapted to remotely control functionality of the vehicle 1. The intermediate system 41 is configured to receive, from the user device 31 associated with the temporary user 3, the request message 3121 to open the remotely operable lock 111 of the locked space 11 and further configured to, based on the request message 3121, transmit the unlock message 4121 to the vehicle 1 to open the lock 111.

Optionally, the locked space 11 is one or a combination of a body, a trunk, an engine hood, a fuel lid and/or an isolated section of the vehicle 1.

Action 1001

In Action 1001, the owner device 21 transmits, by means of the owner transmitting unit 212, the permission message 2121 comprising access parameters directly or indirectly to the user device 31, wherein the access parameters are configured to be comprised in the request message 3121 to enable the lock 111 to be unlocked based on the access parameters.

Optionally, the permission message 2121 comprises a user selectable web link connecting to the remote intermediate system 41, which web link is adapted to, upon being selected, initiate the request message 3121 to be transmitted to the intermediate system 41.

The permission message 2121 may be comprised in at least one Short Message Service, SMS, message, at least one email and/or a corresponding type of message.

Optionally, the access parameters comprise one or several of vehicle identification parameters, time frame parameters, location parameters, and/or recurrence parameters.

Action 1002

In optional Action 1002, the owner device 21 transmits, e.g. by means of the owner transmitting unit 212, the verification message 2122 to the intermediate system 41, which verification message 2122 comprises the verification parameters corresponding to the access parameters. The unlock message 4121 is adapted to additionally be based on the verification message 2122, to enable the lock 111 to be unlocked additionally based on the verification parameters.

Figure 4:
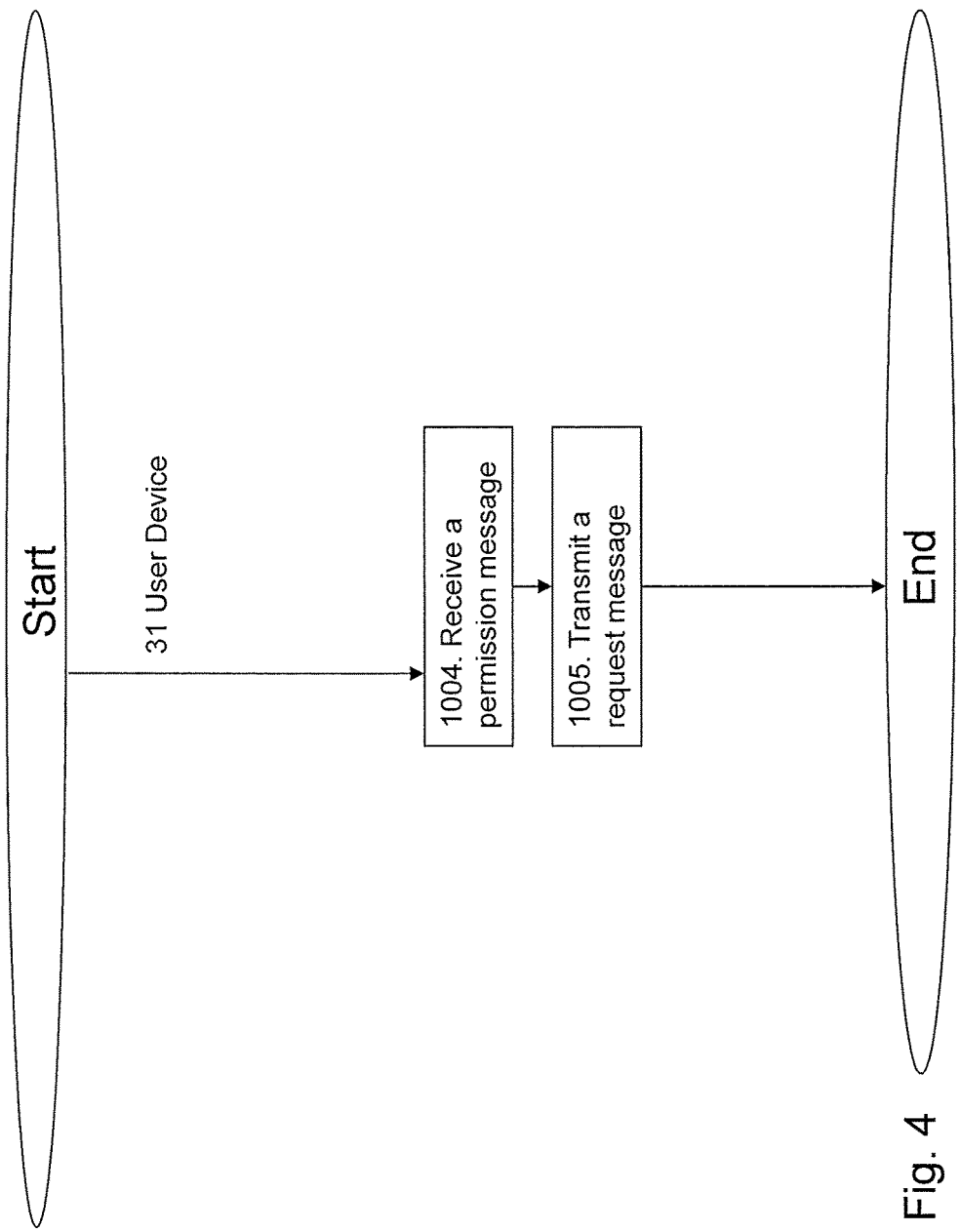
FIG. 4 is a flowchart depicting an exemplifying method performed by an electronic user device associated with a temporary user, for enabling the temporary user to gain temporary access to a locked space of a vehicle, according to embodiments of the disclosure.

FIG. 4 is a flowchart depicting an exemplifying method performed by the user device 31 associated with the temporary user 3, for enabling the temporary user 3 to gain temporary access to the locked space 11 of the vehicle 1, according to embodiments of the disclosure. The exemplifying method, which may be continuously repeated, comprises the following actions discussed with support from FIGS. 1 and 2.

The vehicle 1 is configured to communicate with the intermediate system 41 adapted to remotely control functionality of the vehicle 1. The intermediate system 41 is configured to transmit the unlock message 4121 to the vehicle 1 to open the remotely operable lock 111 of the locked space 11.

Optionally, the locked space 11 is one or a combination of a body, a trunk, an engine hood, a fuel lid and/or an isolated section of the vehicle 1.

Action 1004

In Action 1004, the user device 31 receives, by means of the user receiving unit 311, the permission message 2121 directly or indirectly from the owner device 21 associated with the owner 2 of the vehicle 1, which permission message 2121 comprises the access parameters.

The permission message 2121 may be comprised in at least one Short Message Service, SMS, message, at least one email and/or a corresponding type of message.

Optionally, the access parameters comprise one or several of vehicle identification parameters, time frame parameters, location parameters, and/or recurrence parameters.

Action 1005

In Action 1005, the user device 31 transmits, by means of the user transmitting unit 312, the request message 3121 to open the lock 111, to the intermediate system 41. The request message 4121 comprises the access parameters. The unlock message 4121 is adapted to be based on the request message 3121 to enable the lock 111 to be unlocked based on the access parameters.

Optionally, the permission message 2121 comprises a user selectable web link connecting to the remote intermediate system 41, wherein the Action 1005 of transmitting the request message 3121 comprises the web link being selected.

Optionally, the unlock message 4121 is further adapted to additionally be based on the verification message 2122 configured to be transmitted 1002 from the owner device 21 to the intermediate system 41. The verification message 2122 comprises the verification parameters corresponding to the access parameters, wherein the lock 111 is enabled to be unlocked additionally based on the verifications parameters.

Figure 5:
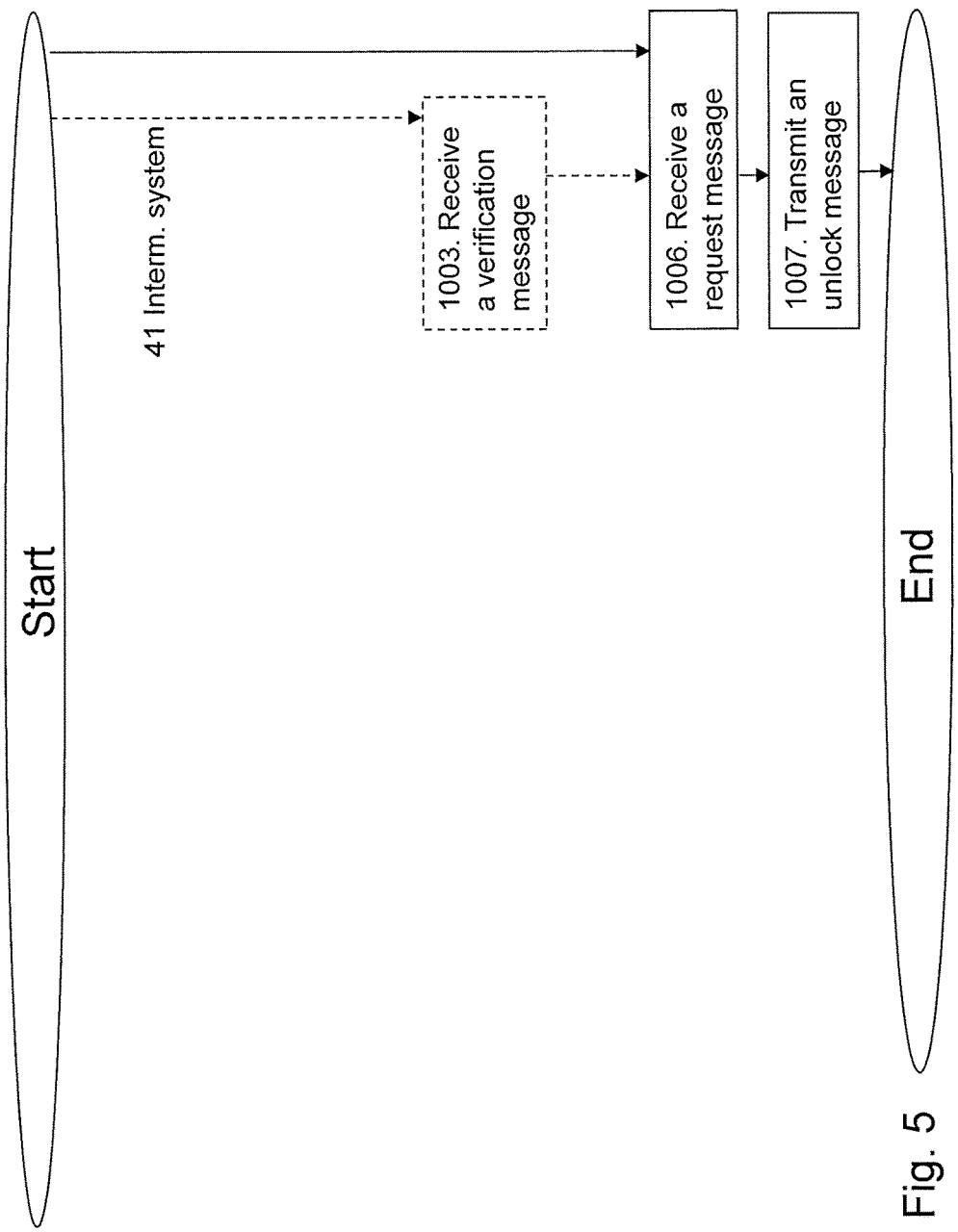
FIG. 5 is a flowchart depicting an exemplifying method performed by an electronic intermediate system adapted to remotely control functionality of a vehicle, for enabling a temporary user to gain temporary access to a locked space of the vehicle, according to embodiments of the disclosure.

FIG. 5 is a flowchart depicting an exemplifying method performed by the intermediate system 41 adapted to remotely control functionality of the vehicle 1, for enabling the temporary user 3 to gain temporary access to the locked space 11 of the vehicle 1, according to embodiments of the disclosure. The exemplifying method, which may be continuously repeated, comprises the following actions discussed with support from FIGS. 1 and 2. The actions may be taken in any suitable order, or even simultaneously, such as Actions 1003 and 1006.

The intermediate system 41 is configured to directly or indirectly communicate with the owner device 21 associated with the owner 2 of the vehicle 1. The owner device 21 is configured to transmit the permission message 2121 comprising the access parameters directly or indirectly to the user device 31 associated with the temporary user 3.

The permission message 2121 may be comprised in at least one Short Message Service, SMS, message, at least one email and/or a corresponding type of message.

Optionally, the access parameters comprise one or several of vehicle identification parameters, time frame parameters, location parameters, and/or recurrence parameters.

Optionally, the locked space 11 is one or a combination of a body, a trunk, an engine hood, a fuel lid and/or an isolated section of the vehicle 1.

Action 1003

In optional Action 1003, which may be performed following Action 1002 of the owner device 21 transmitting the verification message 2122, the intermediate system 41 receives, e.g. by means of the intermediate receiving unit 411, the verification message 2122 from the owner device 21. The verification message 2122 comprises the verification parameters corresponding to the access parameters. The unlock message 4121 is adapted to additionally be based on the verification message 2122, to enable the lock 111 to be unlocked additionally based on the verification parameters.

Action 1006

In Action 1006, the intermediate system 41 receives, by means of the intermediate receiving unit 411, the request message 3121 to open the remotely operable lock 111 of the locked space 11, from the user device 31, which request message 3121 comprises the access parameters.

Optionally, the permission message 2121 comprises a user selectable web link connecting to the remote intermediate system 4, which web link is adapted to, upon being selected, initiate the request message 3121 to be transmitted to the intermediate system 41.

Action 1007

In Action 1007, the intermediate system 41 transmits, based on the request message 3121, by means of the intermediate transmitting unit 412, the unlock message 4121 to the vehicle 1 to open the lock 111, wherein the lock 111 is enabled to be unlocked based on the access parameters.

Figure 6:
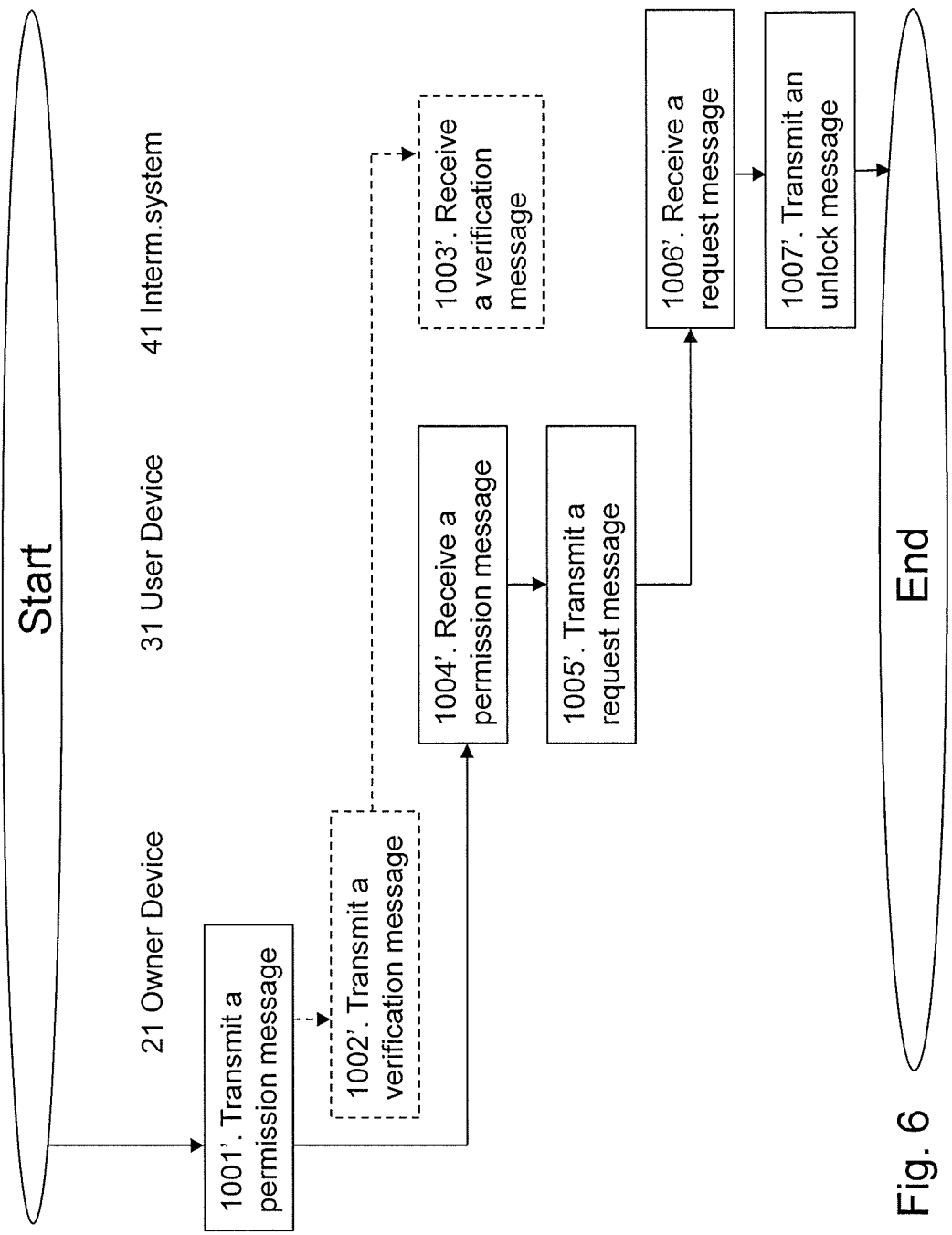
FIG. 6 is a flowchart depicting an exemplifying method performed by a temporary access system, for enabling a temporary user to gain temporary access to a locked space of a vehicle, according to embodiments of the disclosure.

FIG. 6 is a flowchart depicting an exemplifying method performed by the temporary access system 100, for enabling the temporary user 3 to gain temporary access to the locked space 11 of the vehicle 1, according to embodiments of the disclosure. The actions of FIG. 6 reflect the intertwined actions of the owner device 21, user device 31 and intermediate system 41, and thus correspond to Actions 1001 and 1003 of the owner device 21 as described in FIG. 3, Actions 1004 and 1005 of the user device 31 as described in FIG. 4, and Actions 1003, 1006 and 1007 of the intermediate system 41 as described in FIG. 5. The exemplifying method, which may be continuously repeated, hence comprises the following actions, which may be taken in any suitable order, or even simultaneously, such as e.g. Actions 1001' and 1002', and/or Actions 1003' and 1004'.

In Action 1001', the owner device 21 transmits, by means of the owner transmitting unit 212, the permission message 2121 comprising access parameters directly or indirectly to the user device 31.

In optional Action 1002', the owner device 21 transmits the verification message 2122 to the intermediate system 41, which verification message 2122 comprises the verification parameters corresponding to the access parameters.

In optional Action 1003', the intermediate system 41 receives, e.g. by means of the intermediate receiving unit 411, the verification message 2122 from the owner device 21.

In Action 1004', the user device 31 receives, by means of the user receiving unit 311, the permission message 2121 directly or indirectly from the owner device 21.

In Action 1005', the user device 31 transmits, by means of the user transmitting unit 312, the request message 3121 to open the lock 111, to the intermediate system 41. The request message 4121 comprises the access parameters.

Optionally, the permission message 2121 comprises a user selectable web link connecting to the remote intermediate system 41, wherein the Action 1005' of transmitting the request message 3121 comprises the web link being selected.

In Action 1006', the intermediate system 41 receives, by means of the intermediate receiving unit 411, the request message 3121 to open the lock 111, from the user device 31.

In Action 1007', the intermediate system 41 transmits, based on the request message 3121, by means of the intermediate transmitting unit 412, the unlock message 4121 to the vehicle 1 to open the lock 111, wherein the lock 111 is enabled to be unlocked based on the access parameters.

Optionally, the unlock message 4121 is adapted to additionally be based on the verification message 2122, to enable the lock 111 to be unlocked additionally based on the verification parameters.

Figure 7:
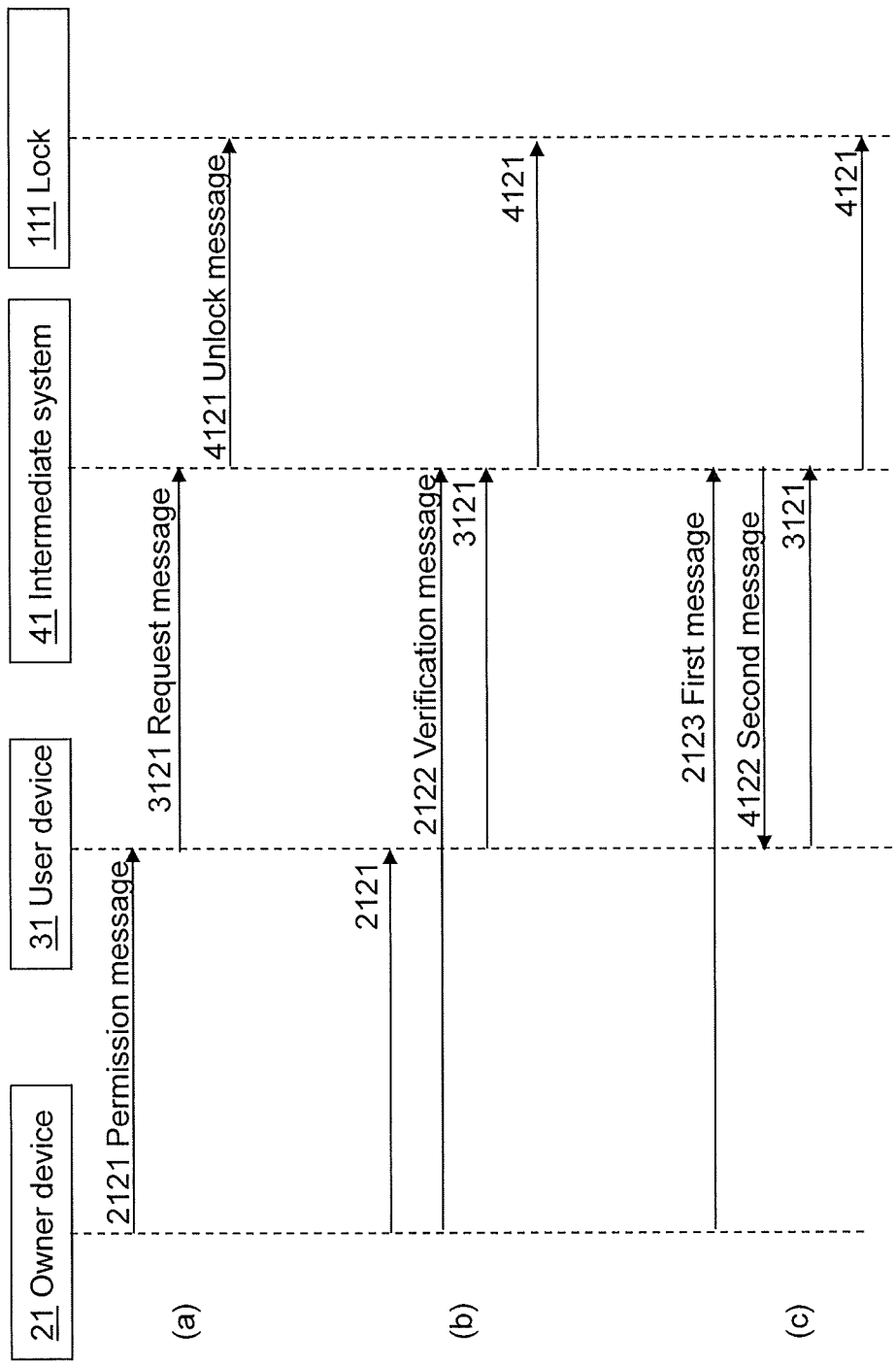
FIG. 7 illustrates an exemplifying signal flow diagram of a temporary access system according to embodiments of the disclosure.

FIG. 7 illustrates an exemplifying signal flow diagram of the temporary access system 100 according to embodiments of the disclosure.

Scenario (a) of FIG. 7 reflects the embodiment illustrated in FIG. 1a, and with support from FIG. 6 thus depicts the owner device 21 transmitting 1001' the permission message 2121 to the user device 31, the user device 31 transmitting 1005' the request message 3121 to the intermediate system 41, and the intermediate system 41 transmitting 1007' the unlock message 4121 to the vehicle 1.

Scenario (b) of FIG. 7 reflects the embodiment illustrated in FIG. 1b, and with support from FIG. 6 thus depicts the owner device 21 transmitting 1001' the permission message 2121 to the user device 31, the owner device 21 transmitting 1002' the optional verification message 2122, the user device 31 transmitting 1005' the request message 3121 to the intermediate system 41, and the intermediate system 41 transmitting 1007' the unlock message 4121 to the vehicle 1.

Scenario (c) of FIG. 7 reflects the embodiment illustrated in FIG. 1c, and with support from FIG. 6 thus depicts the owner device 21 transmitting 1001' the permission message 2121 to the user device 31 via the intermediate system 41, hence the permission message 2121 being represented by the first message 2123 and the second message 4122. Accordingly, there is depicted the owner device 21 transmitting the first message 2123 to the intermediate system 41, and the intermediate system 41 transmitting the second message 4122 to the user device 31. There is furthermore depicted the user device 31 transmitting 1005' the request message 3121 to the intermediate system 41, and the intermediate system 41 transmitting 1007' the unlock message 4121 to the vehicle 1.

Consequently, according to the enabling of a temporary user 3 to gain temporary access to a locked space 11 of a vehicle 1 as described in the foregoing, access conditions incorporated by access parameters, which descend from a permission message 2121 dictated and transmitted from an owner device 21 to a user device 31 and subsequently to an intermediate system 41 in a request message 3121, may be utilized by the intermediate system 41 as underlying conditions for a subsequent provision of temporary access to the locked space 11.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

Although various aspects have been described with reference to exemplary embodiments, many different alterations, modifications and the like will become apparent for those skilled in the art. While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A method performed by a temporary access system for enabling a temporary user to gain temporary access to a locked space of a vehicle, the temporary access system comprising an owner device associated with an owner of the vehicle, a user device associated with the temporary user, and an intermediate system adapted to remotely control functionality of the vehicle, the intermediate system being configured to directly or indirectly communicate with the owner device, the owner device located remote from the intermediate system and being configured to control functionality of the vehicle by communication with the intermediate system, the method comprising:
   receiving, by the intermediate system, a request message transmitted from the user device to open a remotely operable lock of the locked space, wherein the request message comprises access parameters received by the user device via a permission message comprising the access parameters, the permission message transmitted from the owner device directly or indirectly to the user device; and
   transmitting, by the intermediate system, based on the request message, an unlock message to the vehicle to open the lock, wherein the lock is enabled to be unlocked based on the access parameters.

2. The method of claim 1 wherein the permission message comprises a user selectable web link connecting to the remote intermediate system, the transmitted request message comprising the web link selected.

3. The method of claim 1 further comprising:
   receiving, by the intermediate system, a verification message transmitted from the owner device, the verification message comprising verification parameters corresponding to the access parameters;
   wherein the unlock message is adapted to additionally be based on the verification message, to enable the lock to be unlocked additionally based on the verification parameters.

4. The method of claim 1 wherein the permission message comprises at least one Short Message Service, SMS, message, at least one email and/or a corresponding type of message.

5. The method of claim 1 wherein the access parameters comprise one or several of vehicle identification parameters, time frame parameters, location parameters, and/or recurrence parameters.

6. The method of claim 1 wherein the locked space is one or a combination of a body, a trunk, an engine hood, a fuel lid and/or an isolated section of the vehicle.

7. A temporary access system adapted for enabling a temporary user to gain temporary access to a locked space of a vehicle, the temporary access system comprising:
   an intermediate system adapted to remotely control functionality of the vehicle, the intermediate system being configured to directly or indirectly communicate with an owner device associated with an owner of the vehicle, the owner device located remote from the intermediate system and being configured to control functionality of the vehicle by communication with the intermediate system, the owner device comprising an owner transmitting unit adapted for transmitting a permission message comprising access parameters directly or indirectly to a user device associated with the temporary user, the user device comprising a user receiving unit adapted for receiving the permission message directly or indirectly from the owner device and a user transmitting unit adapted for transmitting a request message to the remote intermediate system to open a remotely operable lock of the locked space, wherein the request message comprises the access parameters;
   wherein the intermediate system comprises an intermediate receiving unit adapted for receiving the request message from the user device and an intermediate transmitting unit adapted for transmitting, based on the request message, an unlock message to the vehicle to open the lock, wherein the lock is enabled to be unlocked based on the access parameters.

8. The temporary access system of claim 7 wherein the permission message comprises a user selectable web link connecting to the remote intermediate system, the transmitted request message comprising the web link selected.

9. The temporary access system of claim 7 wherein the permission message comprises at least one Short Message Service, SMS, message, at least one email and/or a corresponding type of message.

10. The temporary access system of claim 7 wherein the access parameters comprise one or several of vehicle identification parameters, time frame parameters, location parameters, and/or recurrence parameters.

11. The temporary access system of claim 7 wherein the locked space is one or a combination of a body, a trunk, an engine hood, a fuel lid and/or an isolated section of the vehicle.

12. A vehicle comprising:

a remotely operable lock for a lockable space of the vehicle, which vehicle is adapted for enabling a temporary user to gain temporary access to the lockable space, the vehicle being configured to communicate with an intermediate system adapted to remotely control functionality of the vehicle, the intermediate system being configured to directly or indirectly communicate with an owner device associated with an owner of the vehicle, the owner device located remote from the intermediate system and being configured to control functionality of the vehicle by communication with the intermediate system, the owner device being adapted for transmitting a permission message comprising access parameters directly or indirectly to a user device associated with the temporary user, the user device being adapted for transmitting a request message to the remote intermediate system to open the lock, the request message comprising the access parameters, the vehicle being adapted to receive, from the intermediate system, based on the request message, an unlock message to open the lock, wherein the lock is enabled to be unlocked based on the access parameters.

13. The vehicle of claim 12 wherein the permission message comprises a user selectable web link connecting to the remote intermediate system, the transmitted request message comprising the web link selected.

14. The vehicle of claim 12 wherein the permission message comprises at least one Short Message Service, SMS, message, at least one email and/or a corresponding type of message.

15. The vehicle of claim 12 wherein the access parameters comprise one or several of vehicle identification parameters, time frame parameters, location parameters, and/or recurrence parameters.

16. The vehicle of claim 12 wherein the locked space is one or a combination of a body, a trunk, an engine hood, a fuel lid and/or an isolated section of the vehicle.

* * * * *